US012647529B2

(12) United States Patent　　　　　(10) Patent No.:　US 12,647,529 B2
Liu　　　　　　　　　　　　　　　　　　(45) Date of Patent:　　Jun. 2, 2026

(54) MULTI-CAMERA VIDEO CONFERENCE IMAGE PROCESSING SYSTEM AND METHOD

(71) Applicant: MAGIC CONTROL TECHNOLOGY CORPORATION, New Taipei City (TW)

(72) Inventor: Pei-Chung Liu, New Taipei City (TW)

(73) Assignee: MAGIC CONTROL TECHNOLOGY CORPORATION, New Taipei City (TW)

( * ) Notice: Subject to any disclaimer, the term of this patent is extended or adjusted under 35 U.S.C. 154(b) by 208 days.

(21) Appl. No.: 18/392,674

(22) Filed: Dec. 21, 2023

(65) Prior Publication Data

US 2025/0008054 A1　　Jan. 2, 2025

(30) Foreign Application Priority Data

Jun. 27, 2023　(TW) .................................. 112123880

(51) Int. Cl.
　　*H04N 7/15*　　　　(2006.01)
　　*H04N 7/14*　　　　(2006.01)
(52) U.S. Cl.
　　CPC ............... *H04N 7/15* (2013.01); *H04N 7/142* (2013.01)
(58) Field of Classification Search
　　CPC .......... H04N 7/15; H04N 7/142; H04N 7/147; H04N 23/611; H04N 23/698; H04N 7/14
　　See application file for complete search history.

(56) References Cited

U.S. PATENT DOCUMENTS

2010/0123770 A1　　5/2010　Friel et al.
2022/0070371 A1*　3/2022　Bushman ............. H04N 23/611
2022/0408029 A1*　12/2022　Wang ........................ G06T 7/70

FOREIGN PATENT DOCUMENTS

CN　　111918018 A　　11/2020
TW　　200401943 A　　2/2004

OTHER PUBLICATIONS

Extended European Search Report for EP Application No. 24151685.5, mailed Jun. 14, 2024, 10 pp.
TW Office Action and Search Report for Application No. 112123880, mailed Jun. 28, 2024, 16 pp. (w/ machine translation).

* cited by examiner

*Primary Examiner* — Yosef K Laekemariam
(74) *Attorney, Agent, or Firm* — NIXON PEABODY LLP

(57)　　　　　ABSTRACT
The present invention relates to a multi-camera video conference image processing system, including: a first panoramic camera for capturing physical features of the conferees in a panoramic manner to generate a first panoramic image; at least one second camera for capturing the physical features of the conferees to generate at least one second image; and a system-on-chip for: receiving the first panoramic image and the at least one second image; processing the first panoramic image to generate a panoramic frame for each conferee; processing the at least one second image to generate a photographic frame for each conferee; corresponding the panoramic frame to the photographic frame for each conferee; selecting the panoramic frame or the photographic frame of each conferee based on the physical features; and processing the selected frames of each conferee, so as to generate and output a video frame.

13 Claims, 11 Drawing Sheets

MULTI-CAMERA VIDEO CONFERENCE IMAGE PROCESSING SYSTEM AND METHOD

BACKGROUND OF THE INVENTION

1. Field of the Invention

The present invention relates to a multi-camera video conference image processing method and system, in particular to a multi-camera video conference image processing method and system capable of obtaining physical features.

2. The Prior Arts

In recent years, panoramic cameras have been widely used in indoor 360-degree conference panoramic photographic and recording occasions, such as panoramic cameras with multi-lens fisheye lens types, which can obtain 360-degree panoramic conference pictures or images. However, since the conventional panoramic camera is generally installed in the middle of the conference room, the viewing angle of the panoramic camera is limited, resulting in the final output image being the side or rear view of the head of the capturing subject. This is a problem that occurs when panoramic cameras are currently used in video conferencing.

FIG. 1 is a schematic diagram of a prior application of a panoramic camera 20 in a conference room 10. FIG. 2 is a schematic diagram of spread panoramic images captured by the panoramic camera 20. In FIG. 1, the directions of the faces of the conferees D1, D2, D3, D4, and D5 will change due to the things they are doing. For example, the faces of the conferees D1, D3, D4, and D5 are all facing the direction of the frame 30, and watching the content displayed on the frame 30. The frame 30 can be located at the front of the conference room 10 and in front of the conference table 40, and is mainly used for displaying content of the video conference. However, for example, the face of the conferee D2 may be facing the direction of the conference table 40. In FIG. 2, when the panoramic image captured by the panoramic camera 20 is spread, limited by the installed position of the panoramic camera 20, the images displayed of the conferees D1, D4, and D5 are the sides of the face and the back of the head. Therefore, this will restrict the remotely connected conferees from observing the facial expressions or emotions of the conferees D1, D4, and D5, and will also affect the remotely connected conferees from clearly understanding what the conferees D1, D4, and D5 want to communicate.

Therefore, the inventor of the application has introduced the present invention after observing the above-mentioned deficiency.

SUMMARY OF THE INVENTION

An objective of the present invention is to provide a multi-camera video conference image processing system for processing images of conferees in a conference room, the multi-camera video conference image processing system comprises: a first panoramic camera set up approximately in the middle of the conference room to capture physical features of the conferees in a panoramic manner, so as to generate a first panoramic image; at least one second camera set up at a front side of the conference room to capture the physical features of the conferees, so as to generate at least one second image; and a system-on-chip for: receiving the first panoramic image and the at least one second image; processing the first panoramic image to generate a panoramic frame for each conferee; processing the at least one second image to generate a photographic frame for each conferee; corresponding the panoramic frame to the photographic frame for each conferee; selecting the panoramic frame or the photographic frame of each conferee based on the physical features; and processing the selected frames of each conferee, so as to generate and output a video frame.

Preferably, the multi-camera video conference image processing system further comprising: an operating device including at least one of a computer, a tablet computer and a mobile phone.

Preferably, the system-on-chip is disposed in at least one of the first panoramic camera and the at least one second camera.

Preferably, at least one of the first panoramic camera and the at least one second camera includes a PTZ function.

Preferably, the physical features include at least one of facial features and body features.

Preferably, the system-on-chip selects the panoramic frame or the photographic frame based on completeness of at least one of the facial features and the body features.

Preferably, the system-on-chip corresponds the panoramic frame to the photographic frame for each conferee according to the physical features in the panoramic frame and the photographic frame.

Preferably, the system-on-chip corresponds the panoramic frame to the photographic frame for each conferee according to relative positions of the first panoramic camera and the at least one second camera.

Another objective of the present invention is to provide a multi-camera video conference image processing method for processing images of conferees in a conference room, the multi-camera video conference image processing method comprises: generating a first panoramic image by capturing physical features of the conferees in a panoramic manner with a first panoramic camera set up in the approximate middle of the conference room; generating at least one second image by capturing the physical features of the conferees with at least one second camera set up at a front side of the conference room; processing the first panoramic image to generate a panoramic frame for each conferee; processing the at least one second image to generate a photographic frame for each conferee; corresponding the panoramic frame to the photographic frame for each conferee; selecting the panoramic frame or the photographic frame of each conferee based on the physical features; and processing the selected frames of each conferee, so as to generate and output a video frame.

In order to make those familiar with the art understand the purpose, characteristics and effects of the present invention, the present invention is described in detail as follows by the following specific embodiments, and in conjunction with the attached drawings.

DETAILED DESCRIPTION OF THE PREFERRED EMBODIMENT

Figure 1:
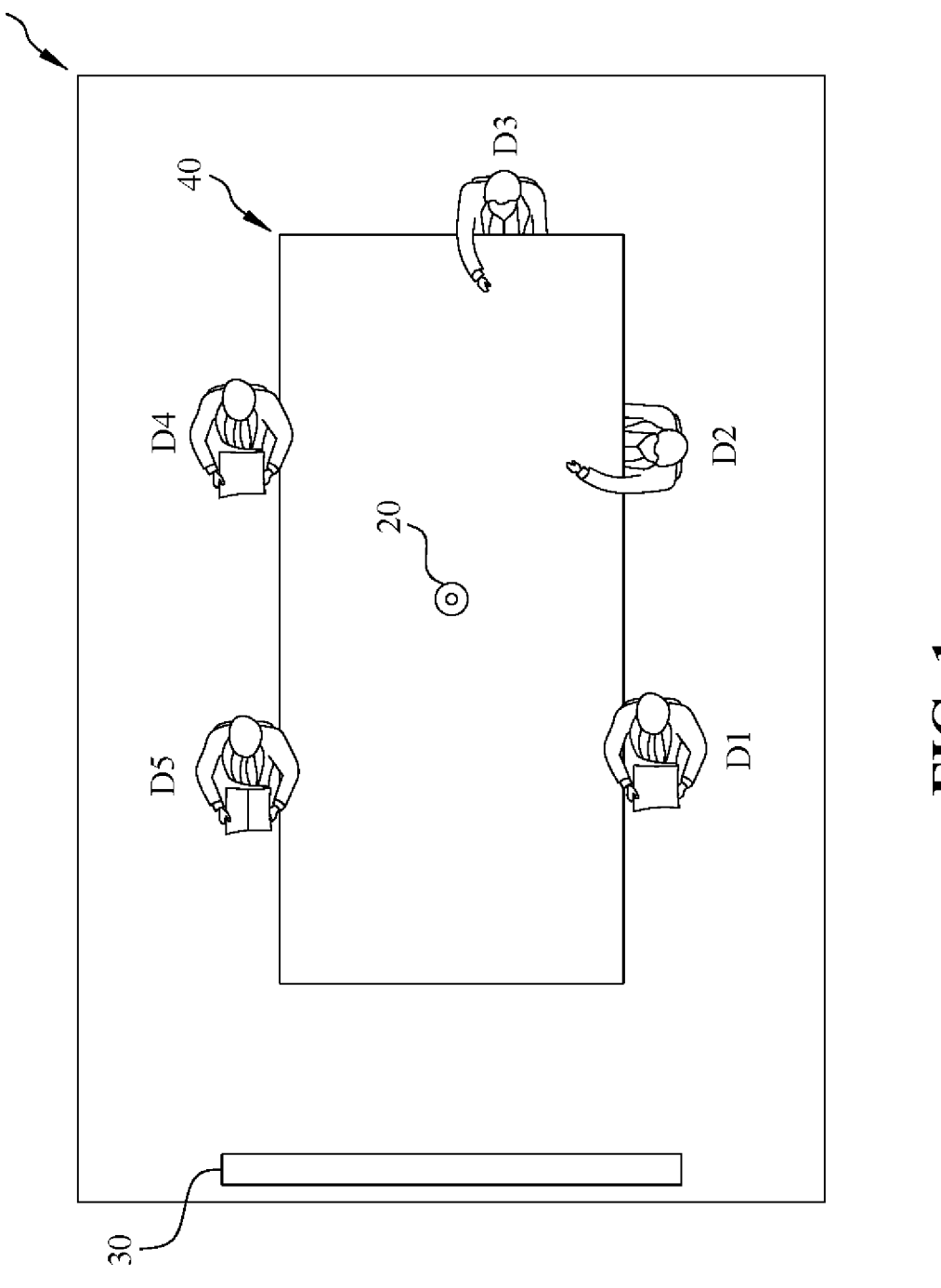
FIG. 1 is a schematic diagram of a conventional panoramic camera used in a conference room.
Figure 2:
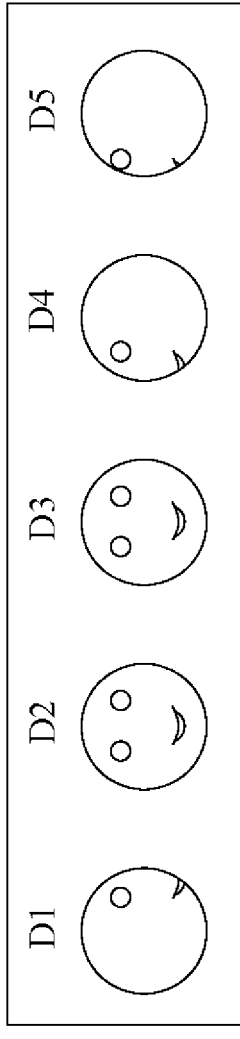
FIG. 2 is a schematic diagram showing the spread panoramic frame captured by the panoramic camera in FIG. 1.

The inventive concept will now be explained more fully hereinafter with reference to the accompanying drawings, in which exemplary embodiments of the inventive concept are shown. Advantages and features of the inventive concept and methods for achieving it will be apparent below by referring to the exemplary embodiments described in more detail with reference to the accompanying drawings. It should be noted, however, that the inventive concept is not limited to the following exemplary embodiments, but can be implemented in various forms. Therefore, the exemplary embodiments are provided only to disclose the inventive concept and to make one skilled in the art understand the category of the inventive concept. In the drawings, the exemplary embodiments of the inventive concepts are not limited to the specific examples provided herein and are exaggerated for clarity.

The terminology used herein is only used to illustrate specific embodiments, and is not intended to limit the present invention. As used herein, the terms "a", "an" and "the" in the singular are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It should be further understood that when the words "comprising" and "including" are used herein, it indicates the existence of stated features, integers, steps, operations, elements, and/or components, but does not exclude one or more other features, integers, steps, operations, elements, components, and/or the presence or addition of groups thereof.

Furthermore, exemplary embodiments in the detailed description will be explained by way of idealized exemplary diagrams that are concepts of the present invention. Accordingly, the shapes of the exemplary figures may be modified according to manufacturing techniques and/or allowable errors. Accordingly, exemplary embodiments of the inventive concepts are not limited to the specific shapes shown in the exemplary figures, but may include other shapes that may be produced according to manufacturing processes. Regions illustrated in the drawings have general characteristics and are used to illustrate specific shapes of elements. Accordingly, this should not be seen as limiting the scope of the inventive concept.

It should also be understood that although the terms "first", "second", "third" and the like may be used herein to describe various elements, these elements should not be limited by these terms. These terms are only used to distinguish various elements. Thus, a first element in some embodiments could be termed a second element in other embodiments without departing from the teachings of the present invention. Exemplary embodiments of aspects of the inventive concept illustrated and illustrated herein include their complementary counterparts. Throughout this specification, the same reference number or the same designator designates the same element.

Additionally, exemplary embodiments are described herein with reference to cross-sectional views and/or plan views that are idealized exemplary illustrations. Accordingly, deviations from the illustrated shapes as a result, for example, of manufacturing techniques and/or tolerances are to be expected. Thus, example embodiments should not be construed as limited to the shapes of regions illustrated herein but are to include deviations in shapes that result, for example, from manufacturing. Thus, the regions shown in the figures are schematic and their shapes are not intended to illustrate the actual shape of a region of a device and are not intended to limit the scope of example embodiments.

In addition, it should be understood that the image captured by the camera may include other background images, for example, other physical features of the conferees, the background of the conference room, the objects on the conference table, and the like. In addition, the distance between the faces of the conferees will also change due to the sitting positions of the conferees, and the size ratio of the faces of the conferees in the image is also related to the distance between the conferees and the camera. Therefore, those skilled in the art should understand that the images captured by the camera shown in the drawings of the present invention are only exemplary, and are for the convenience of description and understanding.

Figure 3:
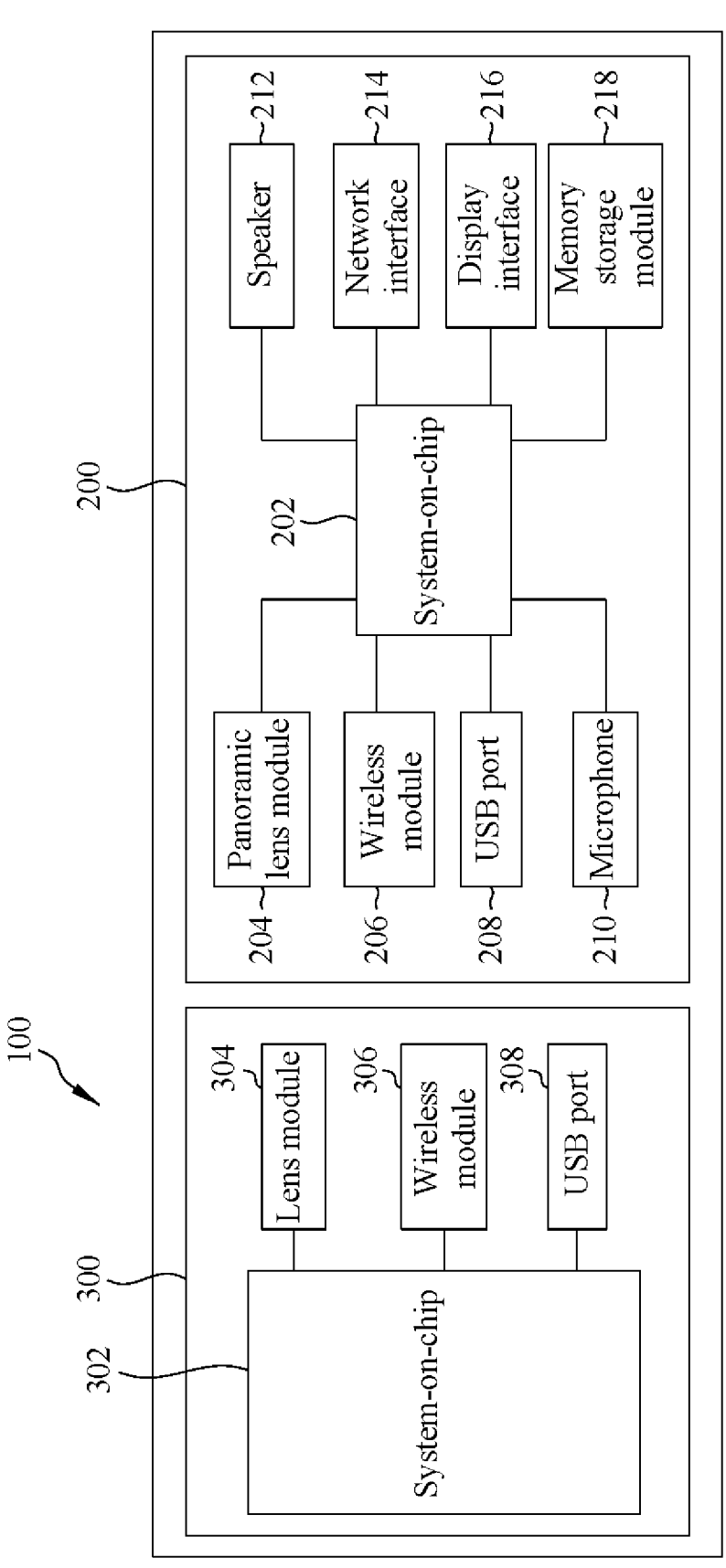
FIG. 3 is a block diagram of a multi-camera video conference image processing system according to a first embodiment of the present invention.

Please refer to FIG. 3, which is a block diagram of a multi-camera video conference image processing system 100 according to a first embodiment of the present invention. As shown in FIG. 3, the multi-camera video conference image processing system 100 according to the present invention includes: a first panoramic camera 200 for capturing the physical features of the conferees in a panoramic manner to generate a first panoramic image; and a second camera 300 for capturing the physical features of the conferees to generate a second image.

Specifically, referring to FIG. 3, the first panoramic camera 200 includes: a system-on-chip 202 for the function operation of first panoramic camera 200 and image processing, specifically, the system-on-chip 202 includes, for example, RK3588 chip of Rockchip or QCS8250 chip of Qualcomm, etc.; a panoramic lens module 204 for capturing the physical features of the conferees in a panoramic manner, including a lens, an image sensor, and a motor (for example, a voice coil motor or a PTZ motor); a wireless module 206 for connecting to other devices wirelessly, for example, the wireless module 206 may include Wi-Fi or Bluetooth for connecting to the second camera 300 or other devices; a universal serial bus (USB) port 208 for wired connection to the second camera 300 or other devices; a microphone 210 for receiving sound; a speaker 212 for outputting sound; a network interface 214 for connecting to the network; a display interface 216 for displaying the functional interfaces of the first panoramic camera 200 and for ease of operation; and a memory storage module 218 for storing data, such as processed images or data related to image recognition. However, the present invention is not limited thereto. The first panoramic camera 200 may further include other functions and components, such as auto exposure processing, white balance (Auto White Balance), professional image tuning and support for low-light photographic capabilities, so as to adapt to the environment of the conference room, even if the lighting of the conference room is lowered, it can still provide images with the best image quality.

Specifically, referring to FIG. 3, the second camera 300 includes: a system-on-chip 302 for the function operation of the second camera 300 and image processing, specifically, the system-on-chip 302 includes, for example, SAV636G chip of SigmaStar or NT98530 chip of Novatek, etc.; a lens module 304 for capturing the physical features of conferees, including a lens, an image sensor, and a motor (for example, a voice coil motor or a PTZ motor); a wireless module 306 for wirelessly connecting to other devices, for example, the wireless module 306 may include wireless network or Bluetooth, to connect to the first panoramic camera 200 or other devices; and a USB port 308 for wired connection to the first panoramic camera 200 or other devices. However, the present invention is not limited thereto. Similar to the first panoramic camera 200, the second camera 300 may further include other functions and components.

Figure 4:
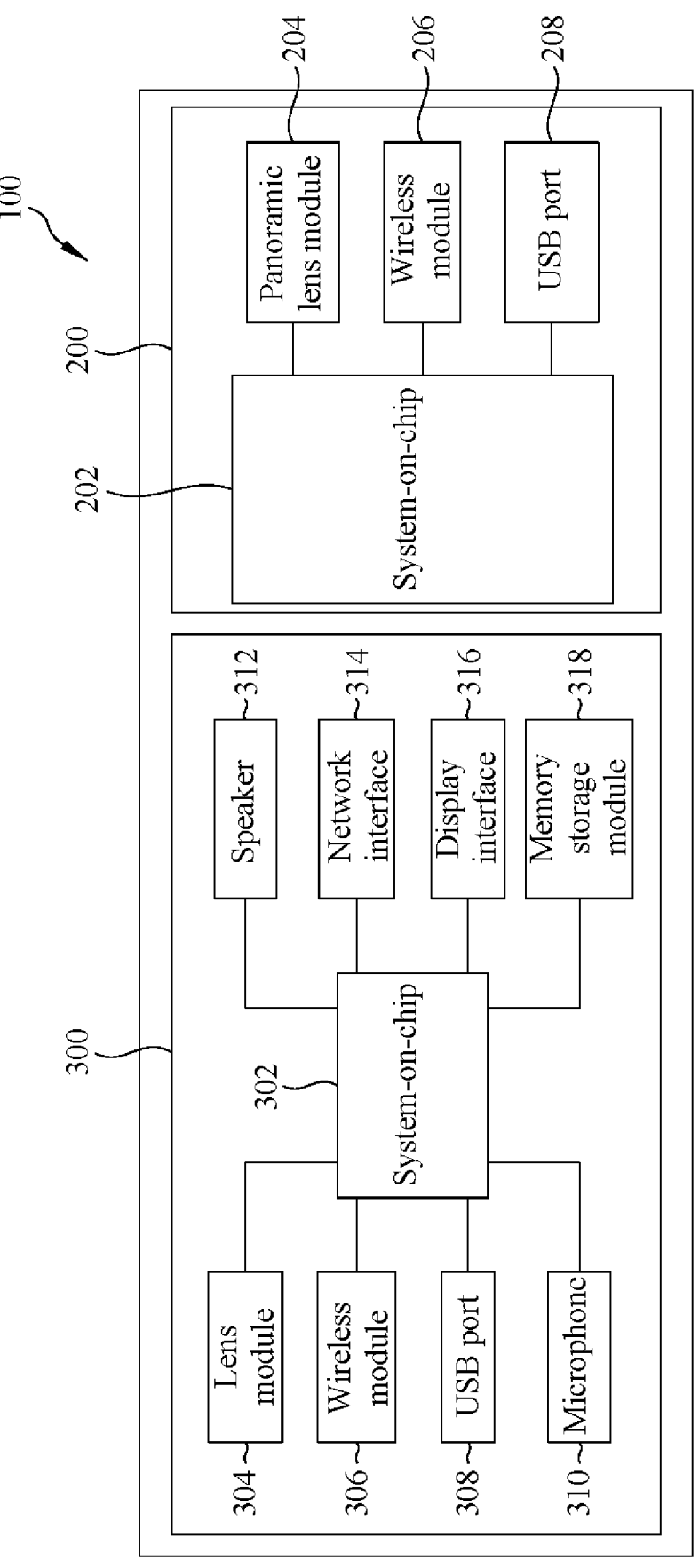
FIG. 4 is a block diagram of a multi-camera video conference image processing system according to a second embodiment of the present invention.

Please refer to FIG. 4, which is a block diagram of the multi-camera video conference image processing system 100 according to a second embodiment of the present invention. The difference between the second embodiment shown in FIG. 4 and the first embodiment shown in FIG. 3 lies in that the components performing the functions that are not related to image capture and data transmission of the first panoramic camera 200 are located in the second camera 300.

Specifically, referring to FIG. 4, the first panoramic camera 200 includes: the system-on-chip 202 for the function operation of the first panoramic camera 200 and image processing, specifically, the system-on-chip 202 includes, for example, RK3588 chip of Rockchip or QCS8250 chip of Qualcomm, etc.; the panoramic lens module 204 for capturing the physical features of the conferees in a panoramic manner, including a lens, an image sensor, and a motor (for example, a voice coil motor or a PTZ motor); the wireless module 206 for wirelessly connecting to other devices, for example, the wireless module 206 may include Wi-Fi or Bluetooth for connecting to the second camera 300 or other device; and the USB port 208 for connecting to the second camera 300 or other devices. However, the present invention is not limited thereto, and the first panoramic camera 200 may further include other functions and components.

Specifically, referring to FIG. 4, the second camera 300 includes: the system-on-chip 302 for the function operation of the second camera 300 and image processing, specifically, the system-on-chip 302 includes, for example, SAV636G chip of SigmaStar or NT98530 chip of Novatek, etc.; the lens module 304 for capturing the physical features of conferees, including a lens, an image sensor, and a motors (for example, a voice coil motor or a PTZ motor); the wireless module 306 for connecting to other devices wirelessly, for example, the wireless module 306 may include wireless network or Bluetooth, to connect to the first panoramic camera 200 or other devices; the USB port 308 for wired connection to the first panoramic camera 200 or other devices; a microphone 310 for receiving sound; a speaker 312 for outputting sound; a network interface 314 for connecting to the network; a display interface 316 for displaying function interfaces of the first panoramic camera 200 and for ease of operation; and a memory storage module 318 for storing data, for example, processed images or data related to image recognition. However, the present invention is not limited thereto, and the second camera 300 may further include other functions and components.

It can be understood that the present invention is not limited to the above-mentioned embodiments, and the first panoramic camera 200 and the second camera 300 may also include components such as a microphone, a speaker, a network interface, a display interface, and a memory storage module at the same time, so as to operate according to the settings of the user. For example, the microphone of the first panoramic camera 200 is used to collect sound, and the speakers of the first panoramic camera 200 and the second camera 300 are used to play sound at the same time.

In addition, the multi-camera video conference image processing system 100 may further include an operating device; the operating device includes at least one of a computer, a tablet computer and a mobile phone, so as to operate functions of the first panoramic camera 200 and the second camera 300. For example, the user can select the image output mode, set the focus object among the conferees, select the size of the image zoom, etc., in the software installed on the operating device.

It should be noted that the first panoramic camera 200 and the second camera 300 include the system-on-chip 202 and the system-on-chip 302, respectively. Therefore, both the first panoramic camera 200 and the second camera 300 can use their respective system-on-chips and be directly used for video conferences with remote devices without being connected to other operating devices. The first panoramic camera 200 and the second camera 300 can also share the system-on-chip, instead of both having separate system-on-chips, so as to reduce the module cost.

According to the embodiment of this application, the system-on-chip 202 and the system-on-chip 302 can be used for: receiving the first panoramic image and the second image; processing the first panoramic image to generate a panoramic frame for each conferee; processing the second image to generate a photographic frames for each conferee; corresponding the panoramic frame to the photographic frame for each conferee; selecting the panoramic frame or the photographic frame of each conferee based on physical features; and processing the selected frames of each conferee, so as to generate and output a video frame.

Figure 5:
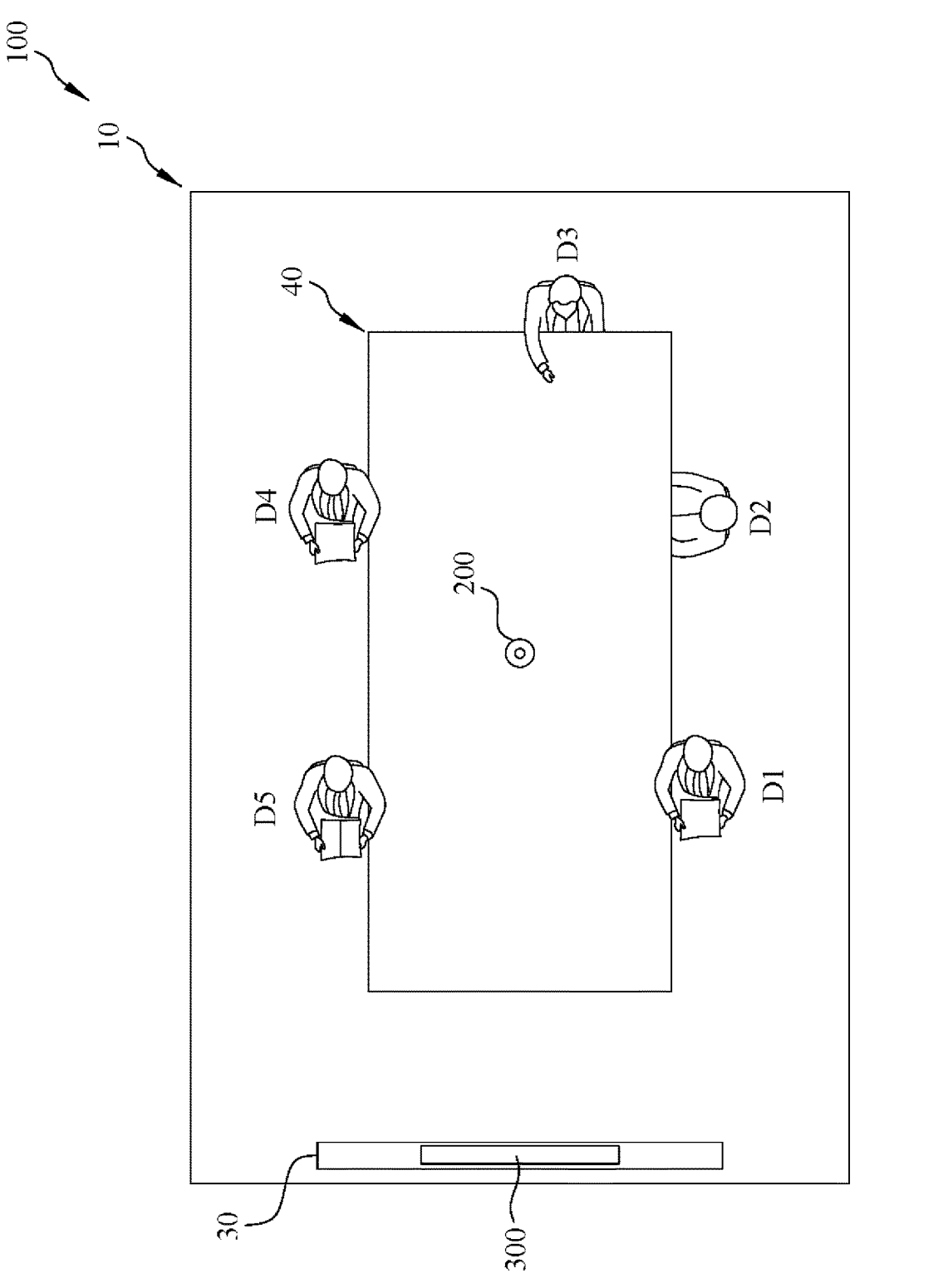
FIG. 5 is a schematic diagram of a multi-camera video conference image processing system set up in a conference room according to an embodiment of the present invention.

Please refer to FIG. 5, which is a schematic diagram of a multi-camera video conference image processing system that is set up in a conference room according to an embodiment of the present invention. Usually, when the multi-camera video conferencing image processing system 100 is set up in the conference room 10, the first panoramic camera 200 is set up approximately in the middle of the conference room 10, or set up in the middle of the conferees, surrounded by the conferees, and the second camera 300 is set up at a front side of the conference room 10, for example, the second camera 300 can be set up at an upper side of the frame 30, near the frame 30, or the second camera 300 can be integrated into the frame 30. However, the present invention is not limited thereto, and the position of the second camera 300 can be changed arbitrarily or a plurality of second cameras can be set up according to the needs of user.

In addition, it can be seen from FIG. 5 that the faces of the conferees D1, D3, D4, and D5 are all facing the direction of the frame 30, while the face of the conferee D2 is facing the direction of the conference table 40. Therefore, the following will describe how the present invention overcomes the inconsistency between the directions of the faces of the conferees, and solves the problem that the images displayed of the conferees are the side views of the faces and the back views of the head.

Figure 6:
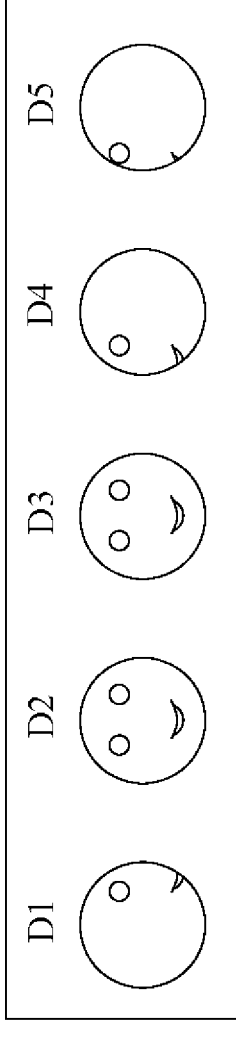
FIG. 6 is a schematic diagram of an image captured by the first panoramic camera according to an embodiment of the present invention.
Figure 7:
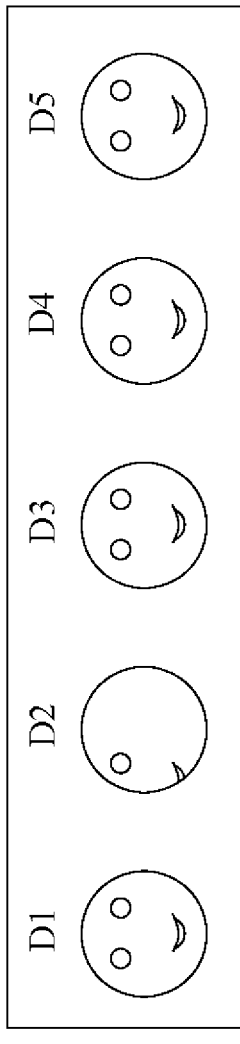
FIG. 7 is a schematic diagram of an image captured by a second camera according to an embodiment of the present invention.

Please refer to FIGS. 6 and 7, FIG. 6 is a schematic diagram of an image captured by a first panoramic camera according to an embodiment of the present invention, and FIG. 7 is a schematic diagram of an image captured by a second camera according to an embodiment of the present invention. In FIG. 6, in the image obtained after spreading the image captured by the first panoramic camera 200, according to the installation position of the first panoramic camera 200 and the face directions of the conferees D1-D5, the panoramic frame of the conferee D1 is displayed as the right back side of the face, the panoramic frames of conferees D2 and D3 are displayed as the front face, the panoramic frame of conferee D4 is displayed as the left side of the face, and the panoramic frame of conferee D5 is displayed as the left rear side of the face. In FIG. 7, in the images captured by the second camera 300, according to the installation position of the second camera 300 and the face directions of the conferees D1-D5, the photographic frames of the conferees D1, D3, D4, and D5 are displayed as the front face, and the photographic frame of conferee D2 is displayed on the left side of the face. Therefore, from the panoramic frames and photographic frames of the conferees, since the panoramic frames of the conferees D1, D4, and D5 are not displayed as front faces, but the photographic frames of the conferees D1, D4, and D5 are displayed as front faces, the present invention will replace the panoramic frames of conferees D1, D4, and D5 with the photographic frames of conferees D1, D4, and D5, so that all conferees can have front-facing frames displayed in the output video frame.

It can be understood that, in the present invention, the physical features of the conferees may be at least one of body features and facial features. For example, the physical features can be set as body features of conferees. In the case that the physical features are set as the body features of the conferees, the first panoramic camera 200 and the second camera 300 will capture the body features of the conferees as completely as possible, so that the conferees connected at a distant location can clearly see the body movements of each conferee. As another example, the physical features may be set as facial features of conferees. In the case that the physical features are set as the facial features of the conferees, the first panoramic camera 200 and the second camera 300 will capture the facial features of the conferees as completely as possible, so that the conferees connected at a distant location can clearly see the facial expressions of individual conferees.

In addition, in the process of image processing, in addition to the above-mentioned step of selecting a photographic frame or a panoramic frame, the system-on-chip can further perform image processing. For example, computer vision algorithms are used to process incoming frames or images, such as edge detection, image segmentation and feature extraction. In addition, a person detection algorithm is used to identify and locate people in the frame or video, such as the faces of conferees, human body shapes or other objects of interest. Also, a person detection algorithm is used to identify and locate a person in a frame or video. Also, once a person is identified, artificial intelligence algorithms can use motion tracking technology to track the movement of the person over time. This allows the camera to adjust its position or field of view (FOV) and framing to keep the character centered in the frame. In addition, artificial intelligence algorithms can also extract features such as facial features or human body shape, which can be used to trigger specific actions or commands. Also, decision-making algorithms can determine the best course of action based on the information gathered. For example, you might decide to zoom in on the face of a conferee face if the conferee is talking, or switch to a wider-angle view if the conferee is walking around. However, the present invention is not limited thereto, and various image processing functions can be arbitrarily changed or increased or decreased according to user requirements.

Specifically, when selecting a photographic frame or a panoramic frame of a conferee, the panoramic frame or the photographic frame can be selected according to the completeness of facial features. For example, the completeness of facial features can be determined using the above or any known algorithm. For example, the facial completeness of both the panoramic frame and the photographic frame can be judged according to the completeness of the facial features of the conferee. That is, a frame with high completeness of the facial features is selected. For example, the angle of the face can be determined according to a known algorithm. If the face angle is frontal, it can be judged as 100% complete. If the face angle is left or right, it can be judged as 50% complete. If the face angle is the backwards, it can be judged as 0% complete, and so on. In addition, if the completeness of the two is the same, for example, both the panoramic frame and the photographic frame of the conferee D3 are frontal, then the panoramic frame of the first panoramic camera 200 can be selected, so that the second camera 300 can be used to capture frames of other conferees. For another example, the symmetry of facial features can also be used to judge completeness. A panoramic frame or photographic frame with high symmetry can be judged to have relatively complete facial features and be regarded as a front view; a panoramic frame or photographic frame with low symmetry can be judged to have less complete facial features and be considered as side view.

Alternatively, the panoramic frame or the photographic frame can be selected according to the completeness of the body features. For example, the completeness of body features may be determined using the above or any known algorithm. For example, a panoramic frame or photographic frame with two arms can be regarded as a front view and can be judged as 100% complete. A panoramic frame or photographic frame with only one arm is left or right and can be judged to be 50% complete. In addition, facial features can be further used to assist in judging the completeness. For example, in a panoramic frame or photographic frame with two arms, facial features can be used to distinguish between the front-view and back-view. For another example, the body width can also be used to judge the completeness. A panoramic frame or photographic frame with a larger body width has higher completeness and can be regarded as a front view; a panoramic frame or photographic frame with a smaller body width has a lower completeness and can be viewed as side-view.

Figure 8:
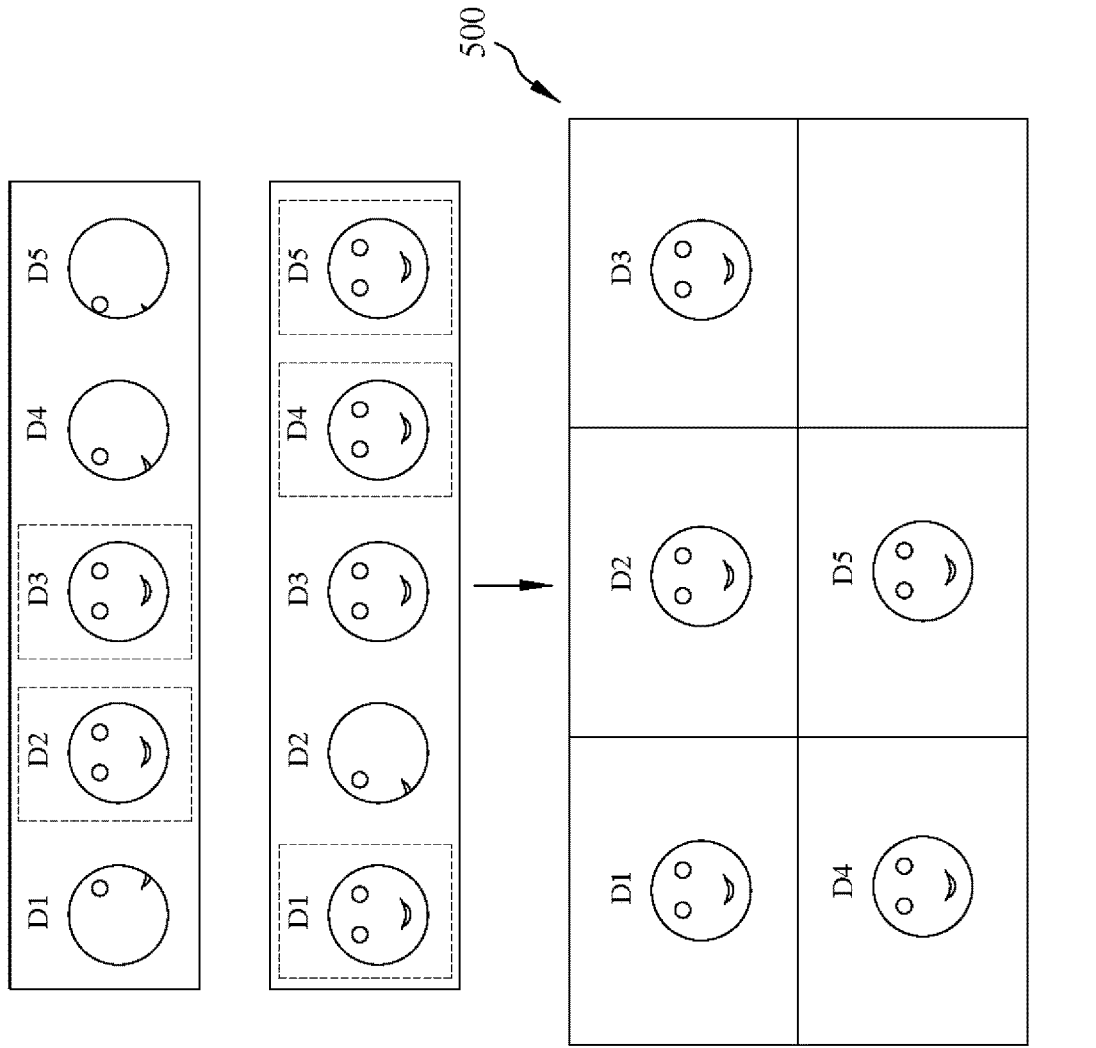
FIG. 8 is a schematic diagram of a first example of selecting a panoramic frame or a photographic frame of each conferee from the images captured by the first panoramic camera and the second camera according to FIGS. 6 and 7.

Referring to FIG. 8, FIG. 8 is a schematic diagram of a first example of selecting a panoramic frame or a photographic frame of each conferee from the images captured by the first panoramic camera and the second camera according to FIGS. 6 and 7.

Specifically, after selecting the panoramic frames or photographic frames of each conferee, the multi-camera video conferencing image processing system 100 will perform image processing and arrangement on these frames, so as to be used for video conference. For example, in FIG. 8, the multi-camera video conference image processing system 100 can output a video frame 500 according to the above-mentioned frame selection method. Specifically, the multi-camera video conferencing image processing system 100 will select from the panoramic frames and photographic frames of the conferees, based on the fact that the panoramic frames of the conferees D1, D4, and D5 are not displayed as frontal faces and the photographic frames of the conferees D1, D4, and D5 is shown as frontal faces, select the photographic frames of conferees D1, D4, and D5 and the panoramic frames of conferees D2, D3 (indicated by dotted boxes), and arrange these frames into a video frame 500 according to the method selected by the user.

In addition, it is understandable that the video frames output by the multi-camera video conferencing image processing system 100 are not limited to the example shown in FIG. 8, and the multi-camera video conferencing image processing system 100 can include any image processing or arrangement method, so as to be chosen by the user.

Figure 9:
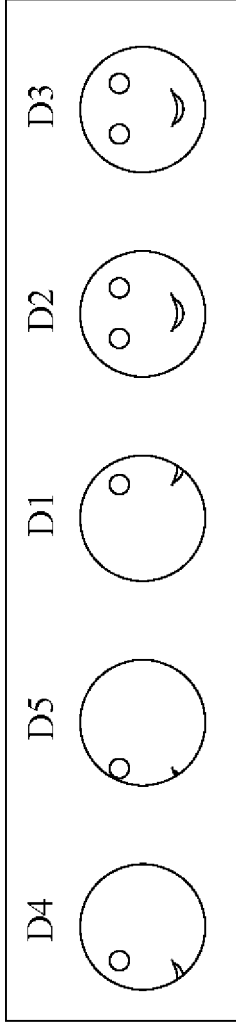
FIG. 9 is a schematic diagram of another image captured by the first panoramic camera according to an embodiment of the present invention.

Referring to FIG. 9, FIG. 9 is a schematic spread view of another image captured by the first panoramic camera according to an embodiment of the present invention. According to an embodiment of the present invention, since the installation position of the first panoramic camera 200 only needs to be approximately in the middle of the conference room 10 and does not need to be placed at any specific angle (for example, the first panoramic camera 200 is rotated to a forward direction), therefore, according to the installation position of the first panoramic camera 200, the facial directions of the conferees D1-D5, and the installation angle of the first panoramic camera 200, the image captured by the first panoramic camera 200 may be as shown in FIG. 9. FIG. 9 shows that based on the different initial placement angles of the first panoramic camera 200, the sequence D4-D5-D1-D2-D3 displayed of the conferees D1-D5 in the spread view is different from the sequence D1-D2-D3-D4-D5 shown in FIG. 6. In such a situation, it is necessary to correspond the panoramic frames to the photographic frames of the conferees D1-D5 before selecting the panoramic frames or photographic frames.

Specifically, in the present invention, the panoramic frames of each conferee may be corresponding to the photographic frames according to the physical features in the panoramic frames and the photographic frames. For example, the feature difference calculation can be used to map the panoramic frames to the photographic frames of each conferee. Specifically, the feature difference calculation is mainly used to identify the differences or similarities of the conferees according to the feature differences of the conferees. For example, correspondences can be established by comparing descriptors between features or key-points. This can be done using various matching methods, such as nearest neighbor matching, random sample consensus matching and deep learning based matching.

Alternatively, in the present invention, the panoramic frames can correspond to the photographic frames for each conferee according to the relative positions of the first panoramic camera 200 and the second camera 300. For example, before capturing the frame, the first panoramic camera 200 and the second camera 300 can confirm the position of each other position by capturing images, wireless connection or any other means, so that the first panoramic camera 200 can spread the panoramic frame along the direction of the second camera 300. Accordingly, in this case, the panoramic frame of the first panoramic camera 200 will correspond to the photographic frame of the second camera 300, so that the conferees in the meeting are completely corresponding.

Figure 10:
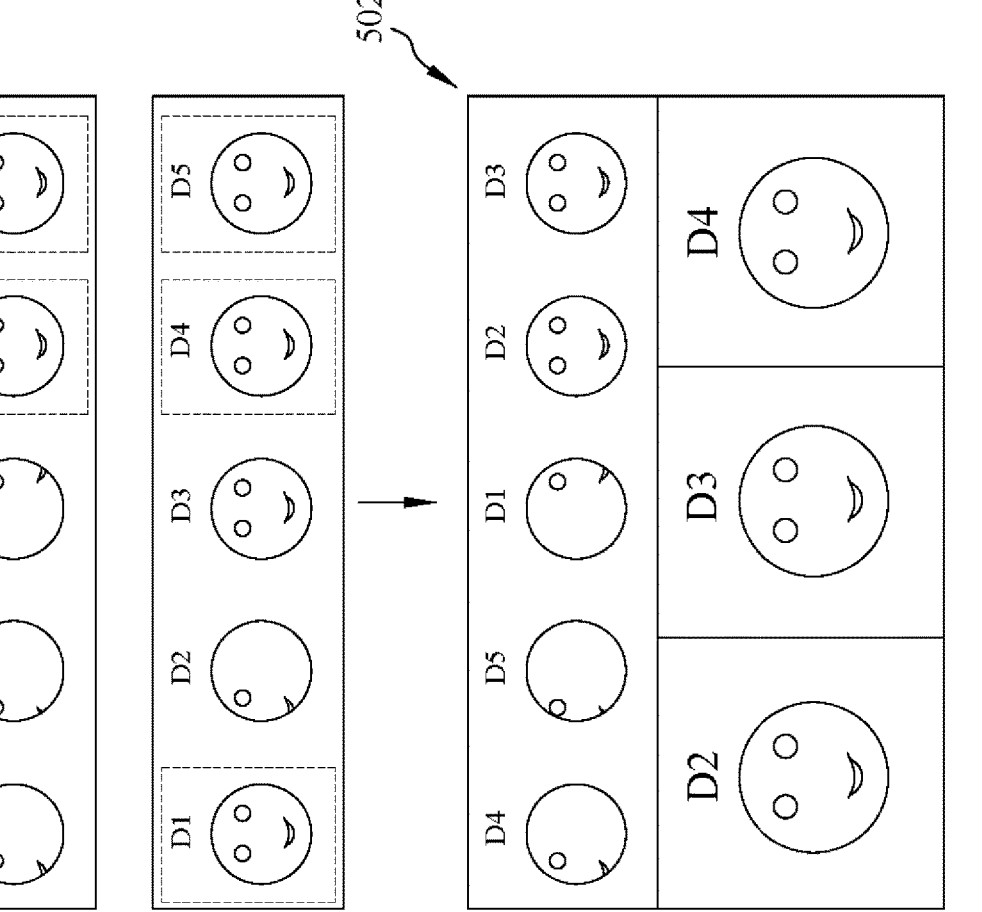
FIG. 10 is a schematic diagram of a second example of selecting a panoramic frame or a photographic frame of each conferee from the images captured by the first panoramic camera and the second camera according to FIGS. 9 and 7.

Please refer to FIG. 10. FIG. 10 is a schematic diagram of a second example of selecting and outputting a panoramic frame or a photographic frame of each conferee from the images captured by the first panoramic camera and the second camera according to FIGS. 9 and 7.

Similar to FIG. 8, in FIG. 10, the multi-camera video conference image processing system 100 can output a video frame 502. According to the foregoing, after the panoramic frame of the first panoramic camera 200 is completely matched to the photographic frame of the second camera 300 to make the conferees completely correspond, the multi-camera video conference image processing system 100 can select the photographic frames of the conferees D1, D4, and D5 and the panoramic frames of conferees D2 and D3 (indicated by dotted square boxes), and arrange these frames into a video frame 502 according to the method selected by the user. For example, the conferees D2, D3, and D4 are the focus objects preset by the user. Therefore, in the video frame 502, the image captured by the first panoramic camera 200 is spread and displayed on the top portion of the video frame 502. That is, it completely corresponds to the spread image in FIG. 9, and in addition, the selected images of the focus objects D2, D3, and D4 are enlarged and displayed in the bottom portion of the video frame 502. It will be appreciated that the video frame 502 of FIG. 10 may be set in any selected and programmed manner. For example, the selected frame may be displayed in the top portion of the video frame 502, that is, the frames showing the frontal faces of the conferees D1 to D5. In addition, the focus object can be selected in any known manner, for example, pre-setting the focus object, setting the person who is speaking as the focus object, or setting the conferee at a specific location as the focus object. For another example, the conferees D2, D3, and D4 related to the topic being discussed are set as the focus object, and the conferee D4 who is speaking is set as the special focus object. In the video frame, in addition to the frame including all the conferees, the images corresponding to the focus objects D2 and D3 will be additionally enlarged for display, and the image corresponding to the special focus object D4 will be additionally enlarged to provide a close-up display. In addition, the focus object is not limited to three persons, and the arrangement method is not limited to the above-mentioned method, which can be adjusted according to needs.

In addition, it is understandable that the video frames output by the multi-camera video conferencing image processing system 100 are not limited to the examples shown in FIGS. 8 and 10, and the multi-camera video conferencing image processing system 100 can include any image processing or arrangement method, so as to be chosen by the user.

Figure 11:
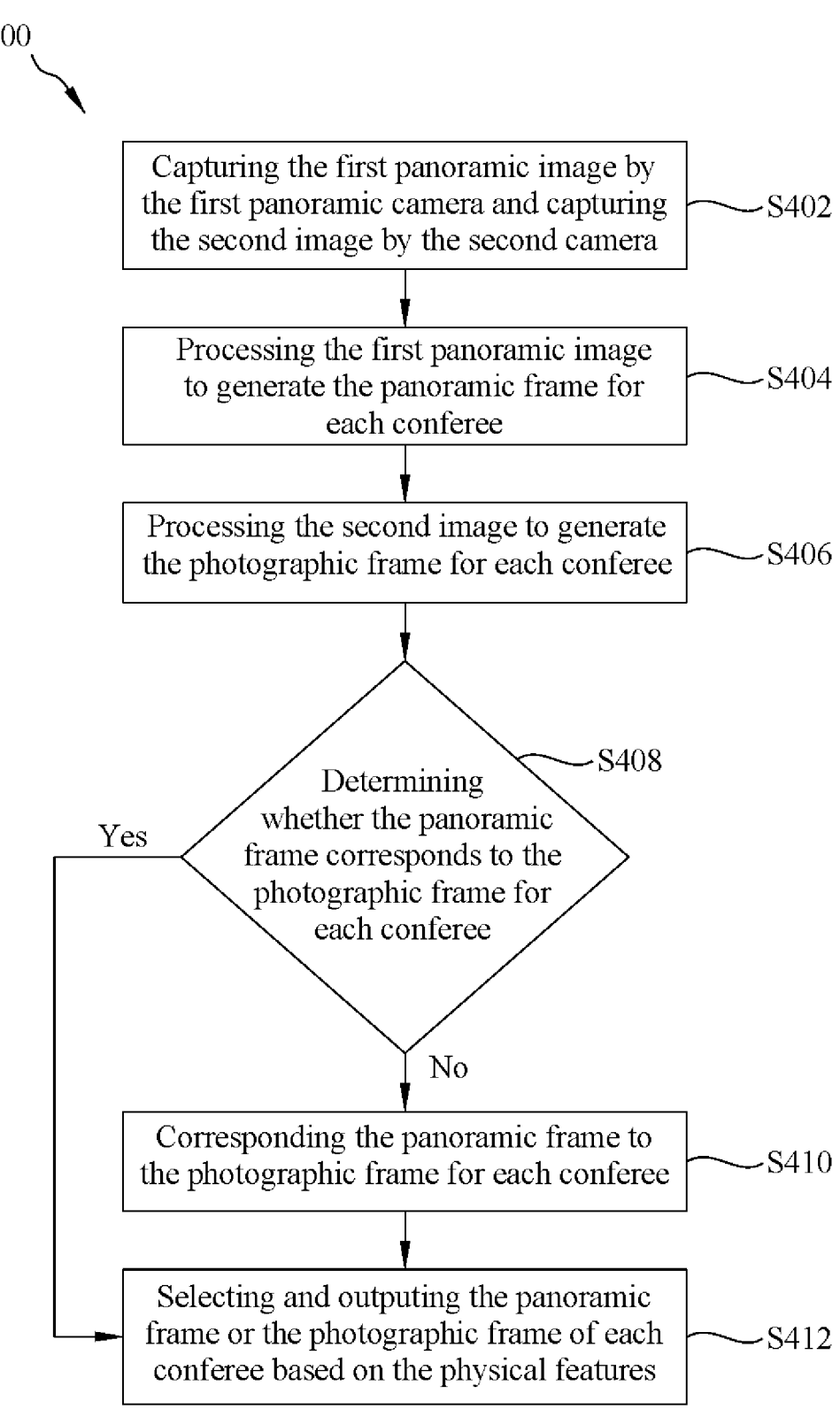
FIG. 11 is a flowchart of a multi-camera video conference image processing method according to an embodiment of the present invention.

Please refer to FIG. 11. FIG. 11 is a flowchart of an image processing method for a multi-camera video conference according to an embodiment of the present invention. In the present invention, the multi-camera video conference image processing method 400 of the embodiment of the present invention includes: step S402, capturing the first panoramic image by the first panoramic camera and capturing the second image by the second camera; step S404, processing the first panoramic image to generate the panoramic frame for each conferee; step S406, processing the second image to generate the photographic frame for each conferee; step S408, determining whether the panoramic frame corresponds to the photographic frame for each conferee; step S410, corresponding the panoramic frame to the photographic frame for each conferee; and step S412, selecting the panoramic frame or the photographic frame of each conferee based on the physical features.

It is understandable that, in step S408, if it is determined that the panoramic frames do not correspond to the photographic frames for each conferee, then step S410 is executed. That is, according to the physical features in the panoramic frame and the photographic frame or according to the relative positions of the first panoramic camera and the second camera, the panoramic frame is corresponded to the photographic frame for each conferee. In step S408 or step S410, after confirming that the panoramic frames correspond to the photographic frames for each conferee, step S412 is executed.

In addition, it is understandable that in the present invention, a plurality of second cameras 300 may be provided. When a plurality of second cameras 300 are provided, the multi-camera video conferencing image processing system 100 of the present invention also uses the above method to process images and frames. For example, when two second cameras 300 are set, the two second cameras 300 capture two second images. When the two second images are processed, two groups of photographic frames of each conferee are generated. Therefore, when selecting the panoramic frame or photographic frame of each conferee, the frame with the highest completeness will be selected among one panoramic frame and two photographic frames for each conferee. Since the two second cameras 300 are set at two different positions, conferees can be photographed from different angles. Therefore, when a plurality of second cameras 300 are installed, it is easier to obtain a more complete frame of the conferees.

The above is to illustrate the implementation of the present invention by specific examples; those skilled in the art can easily understand other advantages and effects of the present invention from the content disclosed in this specification.

The above description is only a preferred embodiment of the present invention, and is not intended to limit the scope of the present invention; all other equivalent changes or modifications that do not depart from the spirit disclosed by the present invention should be included in the following within the scope of the patent.

What is claimed is:

1. A multi-camera video conference image processing system for processing images of conferees in a conference room, the system comprising:

a first panoramic camera set up approximately in the middle of the conference room to capture physical features of the conferees in a panoramic manner, so as to generate a first panoramic image;

at least one second camera set up at a front side of the conference room to capture the physical features of the conferees, so as to generate at least one second image; and a system-on-chip for:

receiving the first panoramic image and the at least one second image;

processing the first panoramic image to generate a panoramic frame for each conferee;

processing the at least one second image to generate a photographic frame for each conferee;

corresponding the panoramic frame to the photographic frame for each conferee;

selecting the panoramic frame or the photographic frame of each conferee based on the physical features; and processing the selected frames of each conferee, so as to generate and output a video frame.

2. The system according to claim 1, further comprising: an operating device including at least one of a computer, a tablet computer and a mobile phone.

3. The system according to claim 1, wherein the system-on-chip is disposed in at least one of the first panoramic camera and the at least one second camera.

4. The system according to claim 1, wherein at least one of the first panoramic camera and the at least one second camera includes a PTZ function.

5. The system according to claim 1, wherein the physical features includes at least one of facial features and body features.

6. The system according to claim 5, wherein the system-on-chip selects the panoramic frame or the photographic frame based on completeness of at least one of the facial features and the body features.

7. The system according to claim item 1, wherein the system-on-chip corresponds the panoramic frame to the photographic frame for each conferee according to the physical features in the panoramic frame and the photographic frame.

8. The system according to claim item 1, wherein the system-on-chip corresponds the panoramic frame to the photographic frame for each conferee according to relative positions of the first panoramic camera and the at least one second camera.

9. A multi-camera video conference image processing method for processing images of conferees in a conference room, the method comprising:

generating a first panoramic image by capturing physical features of the conferees in a panoramic manner with a first panoramic camera set up in the approximate middle of the conference room;

generating at least one second image by capturing the physical features of the conferees with at least one second camera set up at a front side of the conference room;

processing the first panoramic image to generate a panoramic frame for each conferee;

processing the at least one second image to generate a photographic frame for each conferee;

corresponding the panoramic frame to the photographic frame for each conferee;

selecting the panoramic frame or the photographic frame of each conferee based on the physical features; and processing the selected frames of each conferee, so as to generate and output a video frame.

10. The method according to claim 9, wherein the physical features includes at least one of facial features and body features.

11. The method according to claim 10, wherein the panoramic frame or the photographic frame is selected based on completeness of at least one of the facial features and the body features.

12. The method according to claim 9, wherein, for each conferee, the panoramic frame is corresponded to the photographic frame according to the physical features in the panoramic frame and the photographic frame.

13. The method according to claim 9, wherein, for each conferee, the panoramic frame is corresponded to the photographic frame according to relative positions of the first panoramic camera and the at least one second camera.

* * * * *